United States Patent [19]
White

[11] 4,402,281
[45] Sep. 6, 1983

[54] POULTRY CAGE FEED TROUGH STABILIZING SYSTEM

[75] Inventor: Charles A. White, Woodstock, Ga.

[73] Assignee: U.S. Industries, Inc., New York, N.Y.

[21] Appl. No.: 5,284

[22] Filed: Jan. 22, 1979

[51] Int. Cl.³ .................................................. A01K 31/06
[52] U.S. Cl. .......................................................... 119/18
[58] Field of Search .................. 119/18, 48, 17, 52 AF, 119/51 CF

[56] References Cited

U.S. PATENT DOCUMENTS

| | | | |
|---|---|---|---|
| 3,311,087 | 3/1967 | Graves | 119/18 |
| 3,492,970 | 2/1970 | Keen et al. | 119/18 |

Primary Examiner—Hugh R. Chamblee
Attorney, Agent, or Firm—Price, Heneveld, Huizenga & Cooper

[57] ABSTRACT

An array of vertically spaced rows of poultry cages are mounted on opposite sides of A-frame end supports with the uppermost rows engaged and secured to one another along a corner to provide additional stability to the frame. Feed troughs extend along and are secured to the front of the poultry cages so arranged to provide additional strength to the cages while providing feed for the chickens. The feed trough is suspended from and supported by the cage by a plurality of spaced cage clip supports mounting one edge of the generally U-shaped trough to the front of the cages. In order to maintain the feed troughs in a horizontal position, stabilizing rods are provided at spaced intervals along the troughs and include a hook at one end extending over the top corner of the trough remote from the cage. The rods extend downwardly and under the cage and are coupled at the opposite end to a longitudinally extending wire in the floor of the cage to equalize the loading force of the cage on the troughs preventing twisting of the troughs, thus maintaining the floors of the troughs horizontal so that the feed conveyors therein operate properly.

10 Claims, 2 Drawing Figures

POULTRY CAGE FEED TROUGH STABILIZING SYSTEM

BACKGROUND OF THE INVENTION

The present invention relates to poultry cage systems and particularly to means for stabilizing feed troughs used in connection with such systems.

In poultry cage systems of the type described in U.S. Pat. No. 3,311,087, issued Mar. 28, 1967, to J. Graves, and assigned to the present assignee, the feed troughs are suspended along the front of the wire mesh cages and provide support for the cages. In modern poultry raising systems, the feed troughs are supplied with food and include conveyors extending the length of the troughs for continuously supplying food to the hens housed by the cage system. As can be appreciated, the conveyors providing the feed must lie horizontally on the floor of the feed troughs to prevent excessive wear of the troughs or fouling of the conveyors which could occur should the feed trough floors be tilted.

It has been found that maintaining the feed troughs in horizontal orientation is difficult in light of the varying load on the cages which, in turn, deflects the edge of the feed troughs connected to the cage system. This, in turn, tends to twist the feed troughs causing the feed conveyor to wear a groove in or become entangled with the sheet metal feed troughs.

Several efforts have been made to overcome this problem, one of which includes extending wire hooks from one edge of the feed troughs remote from their connection with the cage system underneath the feed trough and onto a vertically extending wire forming part of the front of the cage. Another effort is represented in my copending U.S. patent application, Ser. No. 871,821, filed Jan. 24, 1978, entitled POULTRY CAGES, and assigned to the present assignee. As shown in FIG. 8 of this application, a strip of galvanized material is employed and is attached to two vertically extending wires of the cage system in an effort to stabilize the feed trough. In application, however, both of the prior art efforts have not proven totally satisfactory due to the fact that they still permit the feed troughs to rotate from a horizontal position somewhat as the cage systems become loaded and the edge of the feed trough coupled to the cage deflects downwardly in response to such load.

SUMMARY OF THE INVENTION

The present invention overcomes the problems of the prior art by providing trough stabilizing rods at periodic intervals along the longitudinally extending cage system. Each rod has hook means at one end coupled to the lip of the feed trough remote from its connection with the cages and extends downwardly under the feed trough and the floor of the cage and rearwardly and is coupled to a horizontally extending wire of the cage floor such that the rod is in tension. This equalizes the loading force applied to the edge of the trough adjacent the cage system with a stabilizing load on the outer lip of the trough to maintain the trough floor in a generally horizontally extending position.

These and other objects, features, and advantages of the present invention can best be understood by reference to the following description thereof, together with the drawings in which:

DETAILED DESCRIPTION OF THE PREFERRED EMBODIMENT

Figure 1:
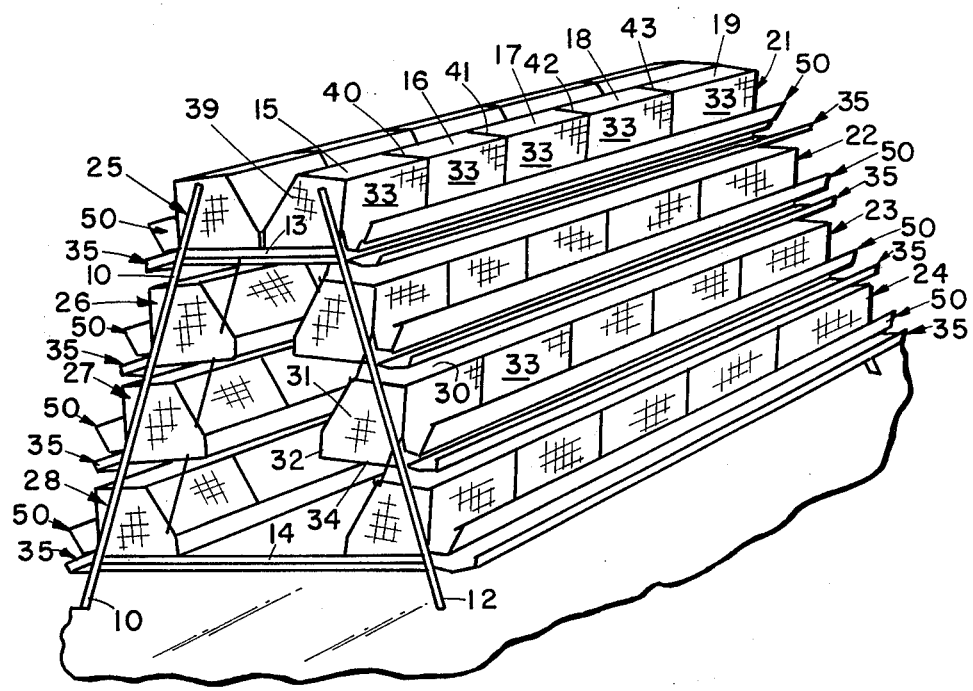
FIG. 1 is a perspective view of a cage system embodying the present invention.

Referring initially to FIG. 1, there is shown a multiple tier poultry cage assembly comprising end A-frames between which there longitudinally extends integral cages made of wire mesh. The construction of the cages is described in detail in my above identified copending application, the disclosure of which is incorporated herein by reference. A brief description of such construction, however, follows.

In the embodiment shown in FIG. 1, each of the end A-frames includes a first leg 10 and a second leg 12 extending from the floor support upwardly and converging inwardly and joined near the top end by means of an upper cross support 13. Near the bottom of legs 10 and 12, there is provided a lower cross support 14. The frame members are made of suitable galvanized channel members conventionally secured to the cross supports by means of bolts. A wire truss (not shown) extends between cross supports 13 and preferably is deflected downwardly and attached to the rear of the uppermost row of cages. Each of the end frames are identical and comprise the only separate frame members for the assembly, the remaining support being accomplished by the cage construction.

Between the end frames there extends eight integral cage assemblies 21 through 28 each of them constituting a row of five cages having a width of 24 inches in a longitudinal direction, a depth of 14 inches extending rearwardly from the support legs inwardly toward cages on the opposite side, and a height of 14 inches. Row 21 thus, for example, includes cages 15 through 19.

Each row of cages is manufactured from two sections of elongated galvanized wire mesh extending the length of the unit. The first section of mesh integrally forms an inclined rear wall 31, a rear wall 32, and a floor 34 which also extends outwardly and is shaped to define an egg receiving tray 35. Tray 35 includes an upwardly extending lip 36 (FIG. 2) and a depression 37 for receiving therein an egg conveyor 38 which extends the length of the egg tray and is shown schematically in FIG. 2, it being understood that such an egg conveyor is provided for all of the egg trays of the system. A support wire 39' of generally U-shaped construction and having one leg attached to the end wall wire mesh 39 is provided and spaced at periodic intervals to provide rigidity to the egg trays 35.

The second section of mesh forming the cages is larger than the first to allow the hens' heads to protrude therethrough for feeding and/or in the space between the vertically spaced cages to be more comfortable. The second section of mesh includes the top 30 and front walls 33. The first and second sections overlap slightly at rear wall 31 and are secured at this junction by roto-rings.

The ends of the cage assemblies each include an end wall 39 while the individual cages are partitioned by similarly shaped partition walls 40 through 43 as seen in FIG. 1 in cage row 21. The end walls 39 and partitioning walls are secured to the wire mesh defining the front, top, rear, and bottom of the cage also by means of rotor-rings which are commercially available and of conventional design.

Figure 2:
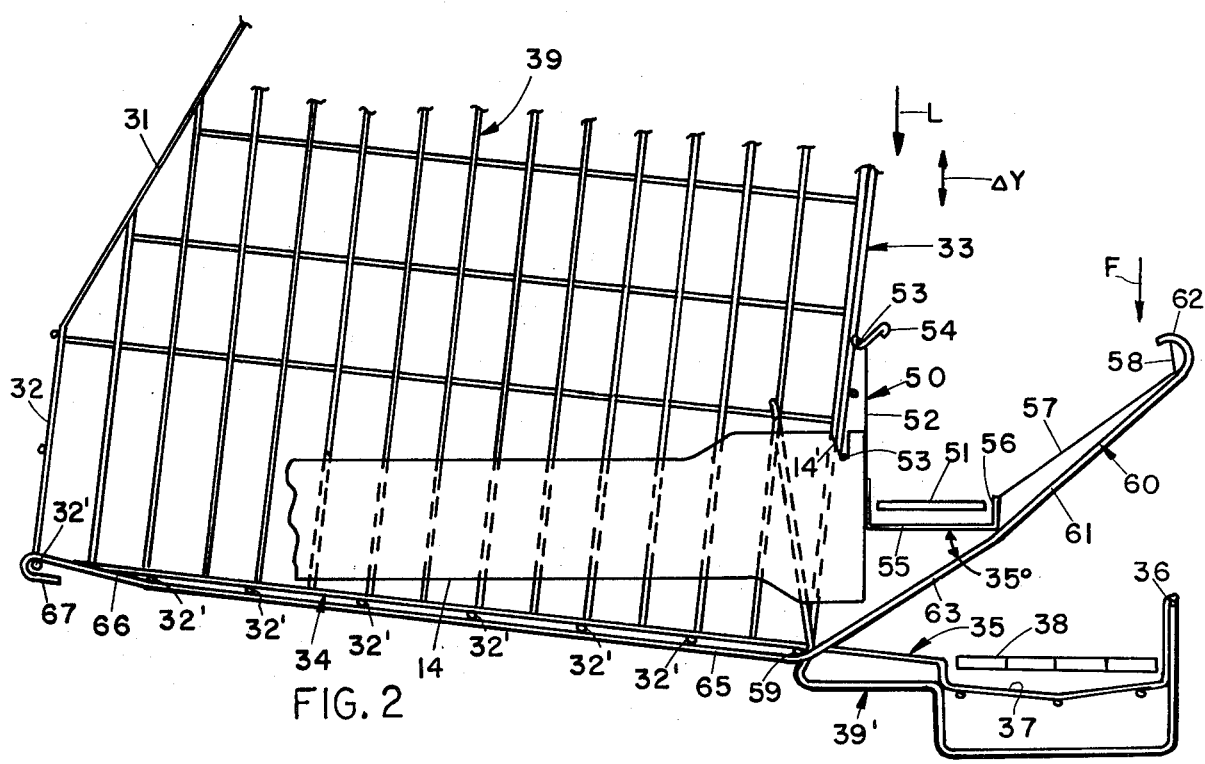
FIG. 2 is an enlarged fragmentary side elevational view of one of the cages showing the stabilizing system of the present invention.

The feed troughs 50 which are associated with each of the cage units 21 through 28 also include a conveyor 51 which is shown schematically in FIG. 2. The conveyor 51 carries a measured and controlled amount of feed to the hens in the cages at a convenient location along the front of each of the cages. The generally U-shaped feed troughs 50 include a rear wall 52 which is secured to a horizontally extending wire 53 forming part of the wire mesh of the front wall 33 of the cages at periodic intervals by means of clips 54. Wall 52 terminates in a support floor 55 extending horizontally for supporting a feed conveyor 51 shown schematically in FIG. 2. At the forward end of floor 55 a lip 56 extends upwardly to define a rectangular recess encompassing the conveyor 51. The integral trough also includes an upwardly and outwardly extending leg 57 terminating in a vertical lip 58 remote from wall 52 coupled to the front of the cages. As noted above, it is essential that the feed trough 50 be secured with its floor 55 essentially horizontal so that the feed conveyor 51 does not wear into the galvanized sheet metal trough. In order to assure this horizontal relationship throughout the length of the unit, a stabilizing rod 60 of the present invention is positioned at intervals of approximately 24 inches along the length of each row of cages.

Before describing the stabilizing rod 60 which comprises a nine gauge wire having a diameter of 0.156 inches and configurated and attached to the cage system as shown in FIG. 2, a brief description of the forces on the feed trough 50 is presented. As noted above, the wall 52 of the trough is supported on the cage at periodic intervals by clips 54. The trough thus provides lateral stability to the cage system and increases its overall structural strength. When, however, the cages are loaded, they tend to deflect downwardly with a loading force indicated by arrow L in FIG. 2. The cages tend to sag slightly in the vertical direction as indicated by arrow $\Delta Y$ also shown in FIG. 2. Thus, if the cages are allowed to sag slightly, the feed trough 50 tends to rotate or twist with the upper lip 58 moving upwardly misaligning the floor 55 from the horizontal orientation desired. In order to prevent this, stabilizing rods 60 are employed and provide a downwardly directed force indicated by arrow F in FIG. 2 which equalizes the load force L about the shear center of the trough which is approximately in the middle of the floor 55 thereby preventing rotation of the trough about the shear center. Having briefly described the forces involved, a description of the stabilizing rod 60 and its operation to achieve the desired stabilization of the feed trough floor is now presented.

Each stabilizing rod 60 includes at the outer or first end hook means 62 comprising a rounded U-shaped hook extends over the lip 58 of the feed trough. From hook 62 the rod extends in a downwardly and inwardly inclined direction with a first leg section 61 and a second leg 63, the junction of which engages the outer corner junction of floor 55 with wall 56 of the trough to provide point contact with the trough at this corner. Leg section 63 then extends downwardly and rearwardly at an angle of approximately 35° to the floor 55. Rod 60 extends under and contacts wire 59 at the lower front corner of the cage. Wire 59 constitutes one of the horizontally and longitudinally extending wires forming the floor of the wire mesh cage. The stabilizing rod integrally includes a rearwardly extending leg section 65 which extends rearwardly and slightly upwardly and an end section 66 which terminates in second hook means comprising a generally U-shaped hook 67. Leg section 65 extends under and contacts several spaced longitudinally extending wires 32' associated with mesh floor 34. Hook 67 is preferably secured, however, to the endmost wire 32' as shown in FIG. 2.

By providing the opposite hook ends 62 and 67 and the contact with the trough and wire 59, the stabilizing rod 60 will not permit the trough to twist or rotate with the floor moving from the horizontal position since the trough is firmly secured. The stabilizing rods in the preferred embodiment are positioned at approximately 2 foot centers although a greater or fewer number of rods could be employed. Also, it may be possible to shorten leg section 65 somewhat such that the hook 67 extends around different ones of the longitudinally extending floor wires 32' although the endmost wire provides the greatest anchoring effect for the stabilizing rod.

As also seen in FIG. 2, the cages are mounted to cross arm 14 which has an end which includes a notch 14' in which one of the longitudinally extending wires 53 of the cage front is supported with the cages inclined downwardly permitting the eggs to roll forwardly into the egg tray.

It will become apparent to those skilled in the art that various modifications to the preferred embodiment of the invention can be made without departing from the spirit or scope of the present invention as defined by the appended claims.

The embodiments of the invention in which an exclusive property or privilege is claimed are defined as follows:

1. For use in a poultry cage system in which a plurality of wire mesh cages are connected in tiers and which include feed troughs supported by the cages along the front thereof and of the type having conveyors disposed within the feed troughs, and wherein the mesh cage include wires extending longitudinally along the lower front corner and along the bottom of the cage spaced from the front, improved means for stabilizing the feed trough against twisting due to deflection of the cage system in response to loading forces on the cage and trough comprising:

a stabilizing rod having hook means at one end for engaging a top corner of the through remote from the cage, said wire formed to extend downwardly and inwardly under the trough and thence rearwardly and terminating at a second end remote from said hook means at said one end with said second end shaped to be secured to a longitudinally extending cage floor wire with said rod in tension to effect a downward force on the outer top edge of the trough and said rod engaging the outer corner of the trough floor for equalizing the loading force on the trough at its connection to the cage to maintain the floor of the trough generally horizontal to prevent adverse contact between the conveyors and the feed troughs.

2. The apparatus as defined in claim 1 wherein said second end of said stabilizing rod includes a hook for securing said second end to a longitudinally extending wire of the cage floor.

3. The apparatus as defined in claim 2 wherein said stabilizing rod extends downwardly from said first hook means at an angle of about 35° to the trough floor.

4. The apparatus as defined in claim 3 wherein a plurality of stabilizing rods are employed and positioned along the trough at spaced intervals.

5. The apparatus as defined in claim 4 wherein said stabilizing rod has a diameter of about 0.15 inches.

6. For use in a poultry cage assembly comprising rows of wire mesh cages mounted on opposite sides of and extending between a pair of end frames in vertically spaced relationship, wherein said cages include a front wall and partition walls defining a plurality of separate cages in each row; a generally U-shaped feed trough extending longitudinally along said front wall of each of said row of cages, said trough having a floor, one wall adjacent the front wall of said row of cages and an outer wall; and a conveyor extending within said trough along the floor thereof, improved means for stabilizing the feed trough against tilting due to deflection under loads to thus maintain the floor of the feed trough in a generally horizontal plane comprising:

a trough stabilizing rod having one end circumscribing said outer leg of said trough and extending under said trough floor and said cage floor, said rod including first hook means for securing one end of said rod to a top corner of said trough remote from said cage and second hook means at the other end for engaging a longitudinally extending wire of said cage floor, said rod engaging an outer corner of the floor of said trough and said rod being placed in tension to prevent tilting of said trough and adverse contact between the conveyor and the trough.

7. The apparatus as defined in claim 6 wherein a plurality of stabilizing rods are provided in spaced relationship along each trough of the cage assembly.

8. The apparatus as defined in claim 7 wherein said rod has a length such that said second hook is secured to the endmost wire of said cage floor.

9. The apparatus as defined in claim 8 wherein said stabilizing rod extends downwardly from said first hook means at an angle of about 35° to the trough floor.

10. The apparatus as defined in claim 9 wherein said stabilizing rod has a diameter of about 0.15 inches.

* * * * *

UNITED STATES PATENT AND TRADEMARK OFFICE
CERTIFICATE OF CORRECTION

PATENT NO. : 4,402,281
DATED : September 6, 1983
INVENTOR(S) : Charles A. White

It is certified that error appears in the above—identified patent and that said Letters Patent is hereby corrected as shown below:

Column 4, line 48:

"through" should be --trough--.

Signed and Sealed this

Twentieth Day of March 1984

[SEAL]

Attest:

GERALD J. MOSSINGHOFF

Attesting Officer     Commissioner of Patents and Trademarks